(12) United States Patent
Cheng et al.

(10) Patent No.: US 11,285,839 B2
(45) Date of Patent: Mar. 29, 2022

(54) VEHICLE, VEHICLE CHARGING SYSTEM AND VEHICLE CHARGING METHOD

(71) Applicant: Gogoro Inc., Hong Kong (CN)

(72) Inventors: Hsun-Wen Cheng, New Taipei (TW); Yu-Chang Chien, New Taipei (TW); Jia-Yang Wu, Taoyuan (TW)

(73) Assignee: Gogoro Inc., Hong Kong (CN)

( * ) Notice: Subject to any disclaimer, the term of this patent is extended or adjusted under 35 U.S.C. 154(b) by 302 days.

(21) Appl. No.: 16/370,816

(22) Filed: Mar. 29, 2019

(65) Prior Publication Data

US 2019/0299803 A1 Oct. 3, 2019

Related U.S. Application Data

(60) Provisional application No. 62/650,238, filed on Mar. 29, 2018.

(51) Int. Cl.
*B60L 53/68* (2019.01)
*B60L 53/62* (2019.01)
(Continued)

(52) U.S. Cl.
CPC ............... *B60L 53/68* (2019.02); *B60L 50/64* (2019.02); *B60L 53/14* (2019.02); *B60L 53/16* (2019.02); *B60L 53/305* (2019.02); *B60L 53/62* (2019.02); *B60L 53/65* (2019.02); *B60L 53/66* (2019.02); *B60L 53/67* (2019.02); *B60L 53/80* (2019.02); *B60L 58/10* (2019.02);
(Continued)

(58) Field of Classification Search
CPC ........ B60L 53/68; B60L 53/62; B60L 53/305; H02J 7/007
See application file for complete search history.

(56) References Cited

U.S. PATENT DOCUMENTS

2010/0010698 A1* 1/2010 Iwashita ................. B60L 53/65
701/22
2010/0079004 A1 4/2010 Keefe
(Continued)

FOREIGN PATENT DOCUMENTS

CN 106329611 A 1/2017
DE 102008050021 A1 5/2009
(Continued)

OTHER PUBLICATIONS

Notice of Publication received for co-pending Philippines Application No. PH1-2019-000152; Applicant Gogoro Inc., dated Nov. 6, 2019, 3 pages.
(Continued)

*Primary Examiner* — Richard V Muralidar
(74) *Attorney, Agent, or Firm* — Perkins Coie LLP (57) ABSTRACT

A vehicle includes a battery connecting module and a processor. The battery connecting module is configured to couple to at least one rechargeable battery. The processor is configured to: determine whether the battery module is coupled to a charging device; in response to the battery module being coupled to the charging device, transmit a permission request to a server; and in response to receiving a charging permission corresponding to the permission request from the server, allow the at least one rechargeable battery to be charged by the charging device.

24 Claims, 5 Drawing Sheets

(51) Int. Cl.
    *B60L 53/80*     (2019.01)
    *B60L 53/30*     (2019.01)
    *B60L 58/10*     (2019.01)
    *B60L 53/16*     (2019.01)
    *H01M 10/42*     (2006.01)
    *H02J 7/00*     (2006.01)
    *B60L 53/66*     (2019.01)
    *B60L 53/65*     (2019.01)
    *B60L 53/67*     (2019.01)
    *B60L 50/64*     (2019.01)
    *B60L 53/14*     (2019.01)

(52) U.S. Cl.
    CPC ........... *H01M 10/425* (2013.01); *H02J 7/007* (2013.01); *B60L 2240/70* (2013.01); *H01M 2010/4278* (2013.01)

(56) References Cited

U.S. PATENT DOCUMENTS

2011/0144844 A1*    6/2011    Ishibashi ................. H02J 7/04
                                                                                                             701/22
2017/0136894 A1    5/2017    Ricci
2018/0029488 A1*    2/2018    Sjodin ................. B60L 3/0076

FOREIGN PATENT DOCUMENTS

| | | |
|---|---|---|
| DE | 102011081679 A1 | 3/2012 |
| JP | 49-061387 U | 4/1975 |
| JP | 2008042984 A | 2/2008 |
| JP | 2011-130560 A | 6/2011 |
| JP | 2012-050268 A | 3/2012 |
| KR | 10-2017-0117456 A | 10/2017 |

OTHER PUBLICATIONS

European Search Report received for European Patent Application No. EP 19166217.0; Applicant Gogoro Inc., dated Sep. 2, 2019, 6 pages.

* cited by examiner

VEHICLE, VEHICLE CHARGING SYSTEM AND VEHICLE CHARGING METHOD

CROSS-REFERENCE TO RELATED APPLICATION(S)

This application claims priority to U.S. Provisional Application Ser. No. 62/650,238, filed on Mar. 29, 2018, which is herein incorporated by reference.

TECHNICAL FIELD

Present disclosure relates to a vehicle, a vehicle charging system and a vehicle charging method. More particularly, the present disclosure provides a verification system for a charging device to charge a vehicle, a method for operating the same and an associated vehicle.

DESCRIPTION OF RELATED ART

Users of electric vehicles (e.g., electric motorcycles or scooters) can swap batteries at battery exchange stations to get charged batteries to power the vehicles. Due to some limitations (e.g., number and intensity) of the battery exchange stations, permission of letting user charge the batteries directly might be helpful to the users. But before having this permission, some difficulties should be solved, such as: (1) if the user is allowed to charge the batteries of the vehicle directly, a coordination mechanism between the direct charging and the current battery exchange station should be considered, and (2) how to make sure the batteries is charged directly under safe and regulated conditions.

SUMMARY

To solve the difficulties mentioned in the description of related art, the present disclosure provides following embodiments with various aspects. The disclosed vehicle charging system and the associated methods can provide the vehicle with a better/safer charging process.

An aspect of the present disclosure is to provide an improved vehicle. The vehicle at least comprises a battery connecting module and a processor. The battery connecting module and the processor are coupled with each other. The battery connecting module is configured to couple to at least one rechargeable battery. The processor is configured to: determine whether the battery connecting module is coupled to a charging device; in response to the battery connecting module being coupled to the charging device, transmit a permission request to a server; and in response to receiving a charging permission corresponding to the permission request from the server, allow the charging device to charge the at least one rechargeable battery.

Another aspect of present disclosure is to provide an improved vehicle charging system. The vehicle charging system comprises a server, a charging device, at least one rechargeable battery and a vehicle. The vehicle is coupled to the server. The vehicle comprises a battery connecting module and a processor. The processor is coupled to the battery connecting module. The battery connecting module is configured to couple to at least one rechargeable battery. The processor is configured to: determine whether the battery connecting module is coupled to the charging device; in response to the battery connecting module being coupled to the charging device, transmit a permission request to the server; and in response to receiving a charging permission corresponding to the permission request from the server, allow the charging device to charge the at least one rechargeable battery.

Still another aspect of present disclosure is to provide an improved vehicle charging method applied on a vehicle. The vehicle charging method at least comprises following steps: determining whether a battery connecting module of the vehicle is coupled to a charging device; in response to the battery connecting module being coupled to the charging device, transmitting a permission request to a server; and in response to receiving a charging permission corresponding to the permission request from the server, enabling the charging device to charge the at least one rechargeable battery.

BRIEF DESCRIPTION OF THE DRAWINGS

The present disclosure can be more fully understood by reading the following detailed description of the embodiment, with reference made to the accompanying drawings as follows.

DETAILED DESCRIPTION

Reference will now be made in detail to embodiments of the present disclosure, examples of which are illustrated in the accompanying drawings. Wherever possible, the same reference numbers are used in the drawings and the description to refer to the same or like parts.

In the following description and claims, units being described with singulars, such as "one", "the", "that", and "this" are not intended to limit the numbers of the described unit.

In the following description and claims, the terms "first", "second", and the like are not intended to limit a specific order of the units being described.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

As used herein, the terms "comprising," "including," "having," and the like are understood to be open-ended, i.e., to mean including but not limited to.

In the following description and claims, the term "and/or" may be used to describe one of a plurality of things or a combination or said things.

In the following description and claims, some of the directions "up", "down", "before", "after", "prior to", "behind" and the like can be considered as references along with the figures. The scope of present disclosure should not be limited thereto.

In the following description, the terms "some embodiments", "one embodiment" and the like are used to describe some specific features, functions, structures, or characteristics of at least one possible embodiment of present disclosure. Such terms can refer to different embodiments. In addition, a combination between multiple embodiments is possible.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

The present disclosure relates to a vehicle, a system and a method. In such system (or method), a charging device, a vehicle, an intermediate device, and a server can associate with each other to charge the vehicle. Generally, when the charging device is electrically coupled to the vehicle, the built-in processor of the vehicle can determine whether to perform the charging process on the battery in the vehicle. The processor of the vehicle can be connected to the network via the intermediate device to establish a bidirectional communication with the server. It is noted that the bidirectional communication between the vehicle and the server can be used to ensure the charging process is implemented under a secure and verified condition. As described in the related art section, in order to solve the potential problem, the verification mechanism can include, but not limited to, the following: confirming the legitimacy of the battery (e.g., check if the battery is verified by the manufacturer, check if the output of the battery is fine, or check if the battery is damaged), confirming the legitimacy of the charging device (e.g., check if the charger is verified by the manufacturer, or check whether the output power of the charger can be applied on the battery), checking whether the vehicle or the battery is allowed to be charged under a rental/purchase plan (e.g., check if the battery is allowable under the rental/purchase plan of the user, check if the battery can output/receive electricity to/from the vehicle, check if the battery is allowed to be charged by the charger under the rental/purchase plan of the user), etc.

Figure 1:
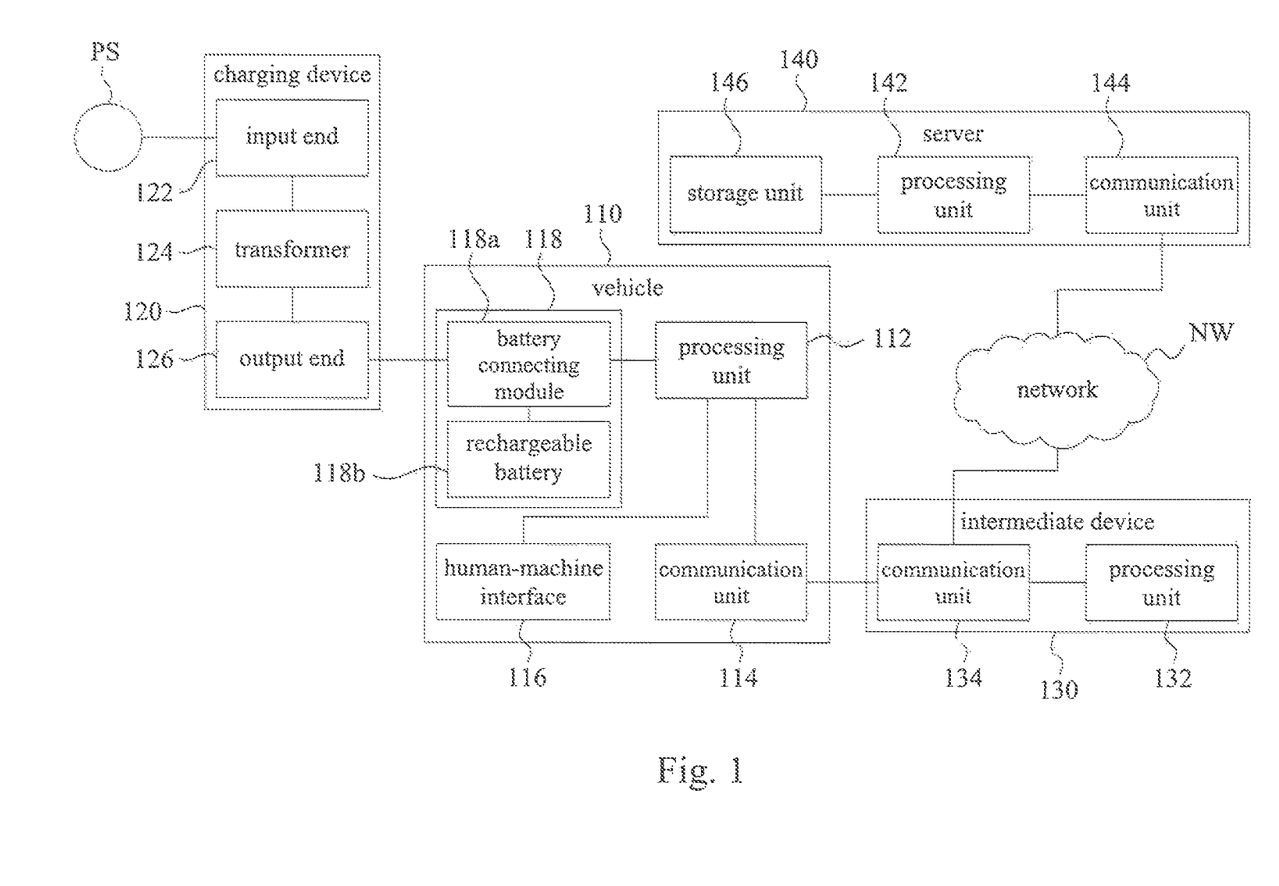
FIG. 1 is a schematic diagram illustrating a vehicle charging system based on some embodiments of present disclosure.

Reference is made to FIG. 1. FIG. 1 is a schematic diagram illustrating a vehicle charging system based on some embodiments of the present disclosure. In some embodiments, as shown in FIG. 1, the vehicle charging system can include a vehicle 110, a charging device 120, an intermediate device 130 and a server 140. It is noted that, in the present disclosure, components of the vehicle charging system are not limited to the foregoing embodiments.

In some embodiments, the vehicle 110 can be electrically or communicatively coupled to the server 140 via the intermediate device 130 so that the vehicle 110 can establish a bidirectional information exchange with the server 140. In some embodiments, the vehicle 110 can be coupled to a power source PS (e.g., mains electricity) via the charging device 120 to perform a charging process to the vehicle 110. Detailed implementations of the components (and/or possible implementations) of the vehicle 110, the charging device 120, the intermediate device 130 would be described in the following paragraphs.

In some embodiments, the vehicle 110 can be an electric vehicle, which refers to a vehicle taking electricity as a main power supply. Electricity can drive an electric engine (e.g., electric motor) of such vehicle so that the vehicle can transport people or cargos with it. In some embodiments, the vehicle 110 can be a one-passenger or two-passenger electric motorcycle or a four-wheel electric car. In some embodiments, the vehicle 110 can include a processing unit 112, a communication unit 114, a human-machine interface 116 and a battery unit 118. However, it is noted that the embodiments are not intended to limit the components and configurations of the vehicle 110.

In some embodiments, the processing unit 112 can be an electronic control unit (ECU) including at least one memory and at least one processor. The memory and the processor can be electrically coupled with each other so that the processor can access specific instructions from the memory. In this manner, the processor can perform some applications based on the specific instructions to operate and/or control the vehicle 110. In some embodiments, said applications can include: applications for driving/stopping the vehicle 110, applications for checking operations of the vehicle 110 and its components, applications for charging/draining electricity to/from the battery unit 118, applications for communicating the processing unit 112 with other devices, and/or applications for verifying the vehicle 110 and its peripheral devices, etc.

In some embodiments, the communication unit 114 can include at least one signal emitter and at least one signal receiver. The communication unit 114 is electrically coupled to the processing unit 112. In some embodiments, the communication unit 114 can transform information from the processing unit 112 to radio waves and use the at least one signal emitter to send the radio waves carrying information to other devices (e.g., the intermediate device 130 and/or the server 140). The communication unit 114 can use the at least one signal receiver to receive radio waves from the other devices and send information being extracted from the radio waves to the processing unit 112. By using the communication unit 114, the processing unit 112 can establish a bidirectional communication with the other devices (e.g., the intermediate device 130 and/or the server 140). In some embodiments, the communication unit 114 can establish such bidirectional communication with the other devices under Bluetooth standard and/or Wi-Fi standard. However, it is noted that the embodiments are not intended to limit the components and communication standards of the communication unit 114.

In some embodiments, the human-machine interface 116 is electrically coupled to the processing unit 112. In some embodiments, the human-machine interface 116 can be an output interface including at least one display (e.g., motorcycle dashboard) and/or at least one speaker. The human-machine interface 116 can transform information from the processing unit 112 into optical forms (e.g., images) and/or acoustic forms (e.g., audios) and display/output such information in the optical forms and the acoustic forms. In this way, a user or an assistant staff around the vehicle 110 can read/listen to the information from the processing unit 112. In some embodiments, the human-machine interface 116 can be an input interface including at least one control component (e.g., switches, buttons, throttles, and the likes). The human-machine interface 116 can transform the operations (e.g., performed by the user/staff) being read on the control component into electrical signals and send the electrical signals to the processing unit 112. In this way, the processing unit 112 can receive and respond to such operations.

In some embodiments, the battery unit 118 can include a battery connecting module 118a. The battery connecting module 118*a* is configured to accommodate/couple to at least one rechargeable battery 118*b*. The battery unit 118 can provide electricity to the processing unit 112, the communication unit 114 and the human-machine interface 116 to maintain operations of the processing unit 112, the communication unit 114 and the human-machine interface 116. In some embodiments, the battery connecting module 118*a* can include a relay. The battery connecting module 118*a* is coupled to the rechargeable battery 118*b* through the relay. The relay can be controlled (e.g., in response to control signals from the processing unit 112) or be predetermined (e.g., based on current or temperature) to enable/disable a connection between the rechargeable battery 118*b* and the vehicle 110. Based on an electricity demand of the vehicle 110, one or more rechargeable batteries 118*b* can be used. For example, when the numbers of batteries are set as two, one of the rechargeable batteries 118*b* can be in use, and another one can be set as a back-up. In some embodiments, the rechargeable batteries 118*b* can be coupled to the battery connecting module 118*a* in a parallel manner or in a serial manner. In some embodiments, to get power supply for the vehicle in a quicker way, the user or the assistant staff of the vehicle 110 can remove the rechargeable battery 118*b* from the battery connecting module 118*a* and replace the rechargeable battery 118*b* (e.g., the depleted one) with a good one (e.g., fully charged one). In some embodiments, the user or the assistant staff of the vehicle 110 can electrically couple the battery connecting module 118*a* of the battery unit 118 to the charging device 120 (e.g., via a provided connection interface of the battery connecting module 118*a*) so that the rechargeable battery can be charged directly.

In some embodiments, the rechargeable battery 18*b* of the battery unit 118 includes a battery management system (BMS, in abbreviation). The BMS includes a microprocessor configured to manage/record the current input/output of the rechargeable battery 18*b* and operations of the rechargeable battery 118*b*. The BMS of the rechargeable battery 18*b* further includes at least one memory that is coupled to the microprocessor. By using the memory of the BMS, the rechargeable battery 118*b* can record information corresponding to the vehicle 110, such as user identities, rental/purchase plans, histories of use, and battery conditions, etc. In some embodiments, the battery connecting module 118*a* can be coupled to the rechargeable battery 118*b* through two channels, which are a channel of power and a channel of information. In some embodiments, these channels can be implemented by wireless transmissions, physical cable connections or a combination thereof. For instance, the channel of power can be implemented by physical cables and associated connection interfaces. Physical cables and associated connection interfaces can be used to implement the channel of information under the controller area network bus (CAN bus) standard. In some embodiments, the channel of information can be implemented in a wireless communication approach such as the near-field communication (NFC) standard. In another example, both the channel of power and the channel of information can be implemented by a wireless charging technology (e.g., Qi standard). However, it is understood that the configurations (and their combinations) in foregoing embodiments are not intended to limit the scope of the present disclosure.

In some embodiments, the charging device 120 can be a portable charger including an input end 122, a transformer 124 and an output end 126. In some embodiments, the input end 122 is configured to be electrically coupled (e.g., via a physical cable) to the power source PS so that the electricity (e.g., AC current) form the power source PS can be delivered to the charging device 120. The transformer 124 is configured to convert the input currents of the power source PS based on a predetermined voltage and transmit the output currents to the output end 126. The output end 126 is configured to be electrically coupled (e.g., via a physical cable) to a load (e.g., the rechargeable battery 118*b* connected to the battery connecting module 118*a* of the battery unit 118) so that the output currents from the transformer 124 can be delivered to the load. However, it is noted that the embodiments are not intended to limit the components and operations of the charging device 120.

In some embodiments, the intermediate device 130 can include a processing unit 132 and a communication unit 134. In some embodiments, the intermediate device 130 can be, but not limited to, a cellphone with network access functions, a telematics module settled in the vehicle, or other available communication devices. The intermediate device 130 can connect to a network NW via the communication unit 134. In some embodiments, the processing unit 132 can include a memory and a processor. The processor is electrically couple to the memory to access specific instructions and execute specific applications. In some embodiments, said applications can include: applications for connecting to the network NW via the communication unit 134, applications for exchanging information with the vehicle 110 and/or the server 140 through the network NW, and/or applications for verifying the vehicle 110 and its peripheral devices, etc. In some embodiments, the communication unit 134 can include a signal emitter and a signal receiver.

The communication unit 134 of the intermediate device 130 can be connected to the communication unit 114 of the vehicle 110 in a wireless fashion or a physical fashion. In this way, the communication unit 134 can be electrically coupled to the processing unit 112 of the vehicle 110. The communication unit 134 can connect to the network NW via the Wi-Fi standard to establish bidirectional information exchange with other devices (e.g., the vehicle 110 and the server 140). The communication unit 134 can be connected to these devices through a physical cable or by a short distance wireless communication standard (e.g., Bluetooth). However, it is noted that the embodiments are not intended to limit the components and operations of the intermediate device 130.

In some embodiments, the server 140 can include a processing unit 142, a communication unit 144 and a storage unit 146. In some embodiments, the server 140 can be a computing device with network access functions. The server 140 can connect to the network NW via the communication unit 144. In some embodiments, the processing unit 142 of the server 140 can include a memory and a processor. The processor is electrically coupled to the memory to access specific instructions and execute specific applications. In some embodiments, the applications can include: applications for connecting to the network NW via the communication unit 144, applications for exchanging information with the intermediate device 130 and/or the vehicle 110 through the network NW, and/or applications for managing/handling/verifying/detecting the vehicle 110 and its peripheral devices, etc.

In some embodiments, in the server 140, the processing unit 142 and the communication unit 144 are electrically coupled with each other. The communication unit 144 can be connected to the other devices (e.g., the vehicle 110 and the server 140) in a wireless fashion or a physical fashion. In some embodiments, the storage unit 146 can include at least one memory being configured to store information corresponding to the vehicle 110, such as user identities, rental/purchase plans, histories of use, and/or the histories of the rechargeable battery 118b in the battery unit 118. However, it is noted that the embodiments are not intended to limit the components and operations of the server 140.

It is noted that, in foregoing embodiments, the terms "electrically coupling" and/or "communicatively coupling" can refer to a physical connection or a non-physical connection. For instance, such coupling can be established by the Wi-Fi standard, the Bluetooth standard, the NFC standard, the CAN bus standard, and/or physical cable connections, etc. These fashions can explain how the "electrically coupling" and/or the "communicatively coupling" are implemented.

It is also noted that, in the embodiments, the mentioned memories can be, but not limited to, flash memories, hard disk drives (HDD), solid state drives (SSD), dynamic random access memories (DRAM) and/or static random access memories (SRAM), or combinations thereof. In some embodiments, the memories can be considered some non-transitory computer readable mediums having at least one computer readable instruction stored therein. The processors can access the computer readable instructions and execute specific applications defined by the computer readable instructions. In this manner, components of the vehicle 110, the charging device 120, the intermediate device 130, and the server 140 can perform predetermined functions. However, the examples are not intended to limit the scope of present disclosure.

It is noted that, in the embodiments above, the processor can include (but not limited to) a single processor and an integration of multiple microprocessors, such as a central processing unit (CPU) and/or an application-specific integrated circuit (ASIC), etc. As mentioned, the processor can access the computer readable instructions from the memory and execute the computer readable instructions in order to run mentioned applications. Through the applications, the functions of the vehicle 110, the charging device 120, the intermediate device 130 and the server 140 can be performed. However, the scope of the present disclosure is not limited thereto.

It is noted that, based on current operational strategy of the battery exchange stations, the rechargeable battery 118b can monitor and store a history of use corresponding to the rechargeable battery 118b, a history of use corresponding to the vehicle 110 that carries the rechargeable battery 118b, and user information corresponding to the users of the vehicle 110. To manage the battery health of the rechargeable battery 118b and measure the power consumptions of the rechargeable battery 118b, the information collected by the rechargeable battery 118b can be useful. In order to make the batteries adapted to both the direct charging mode and battery swapping mode, the service provider (e.g., a keeper of the server 140) can provide a mechanism to avoid the rechargeable battery 118b from being damaged (e.g., the user may use an unauthorized charger). Moreover, when the user applies direct charging to the batteries with the charger (e.g., the charging device 120), the server 140 should be able to retrieve the information (e.g., the history of use) from the vehicle 110 and the rechargeable battery 118b (e.g., gain or consumption of powers). Under this circumstance, the manufacturer/retailer of the vehicle 110 can introduce an authentication mechanism. The mechanism allows the charging device 120 to charge the rechargeable battery 118 of the vehicle 110 if the vehicle 110 is verified by the server 140 (e.g., receiving an authentication token). In some embodiments, the users can purchase the charging device 120 from the manufacturer/retailer of the vehicle 110 and apply for or buy a rental/purchase plan corresponding to the charging device 120. In correspondence, the manufacturer/retailer of the vehicle 110 can add the rental/purchase plan to the user's information. The user information can be stored in the server 140. The server 140 can provide the token to the vehicle 110 based on the rental/purchase plan. The charging device 120 is allowed to charge the vehicle 110 based on the token. It is noted that the token can be stored (maybe temporarily) in the rechargeable battery 118b or the intermediate device 130. Based on the token, the processing unit 112 of the vehicle 110 can determine whether to accept electricity transmission from the charging device 120.

The process performed by the vehicle charging system 120 (including the vehicle 110, the charging device 120, the intermediate device 130 and the server 140) will be explained in following paragraphs.

Figure 2:
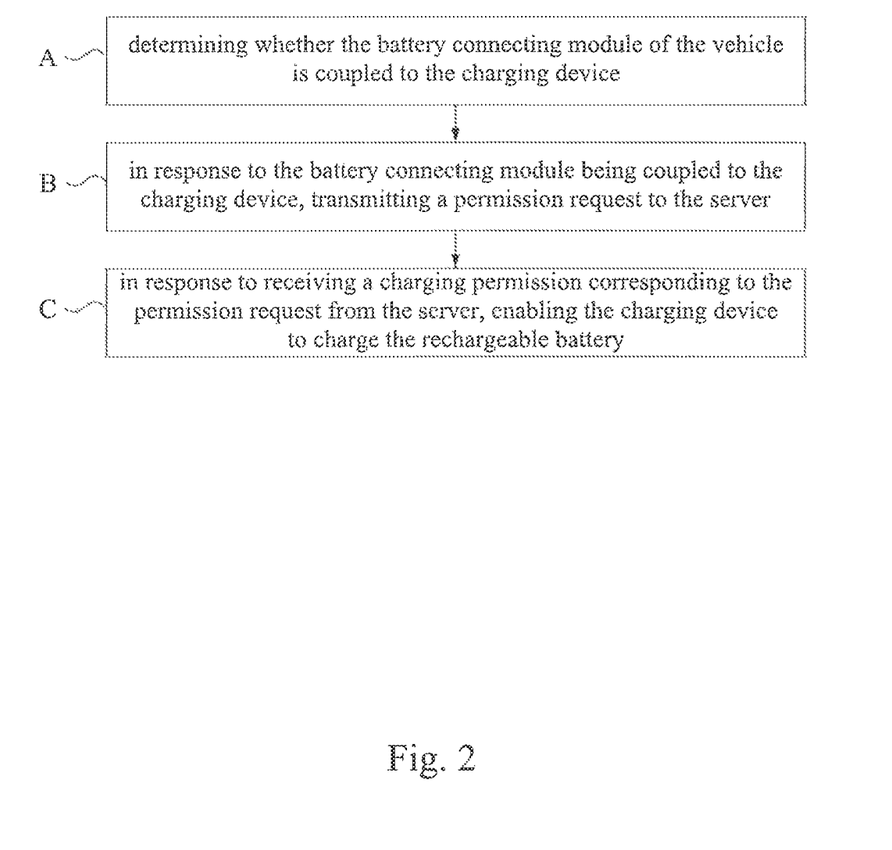
FIG. 2 is a flowchart illustrating a vehicle charging method based on some embodiments of present disclosure.

FIG. 2 is a flowchart illustrating a vehicle charging method based on some embodiments of the present disclosure. In some embodiments, the vehicle charging method shown in FIG. 2 can be performed by the vehicle 110 (e.g., the processing unit 112 of the vehicle 110, or the processing unit 112 cooperated with other components in the vehicle 110) of the embodiment described in FIG. 1. To better understand the vehicle charging system (and its components), the embodiments of FIG. 1 can be referenced.

Step A: determining whether the battery connecting module 118a of the vehicle 110 is coupled to the charging device 120.

In some embodiments, in order to charge the rechargeable battery 118b of the vehicle 110, the user can couple the connection interface (e.g., a power input socket) of the battery connecting module 118a set on the vehicle 110 to the charging device 120, to electrically couple the charging device 120 to the battery connecting module 118a of the battery unit 118 via the connection interface. When the above action is detected, the processing unit 112 of the vehicle 110 can determine whether to perform the following steps B-C of the vehicle charging method. In some embodiments, the connection interface (e.g., the power input socket) can include a signal detect terminal. The processing unit 112 can determine whether the charging device 120 is connected based on a detecting result (e.g., voltage/electron variations) reflected by the signal detect terminal.

Step B: in response to the battery connecting module 118a being coupled to the charging device 120, transmitting a permission request to the server 140.

In some embodiments, if the processing unit 112 determines that the battery connecting module 118a is in connection with the charging device 120, it is shown that the user is trying to charge the rechargeable battery 118b. In response to the action, the processing unit 112 can execute some checking processes or some pre-charging processes for the rechargeable battery 118b before starting the charging. The communication unit 114 can send a permission request to the server 140 to get permission for charging the rechargeable battery 118b of the battery unit 118. It is noted that the details of the checking processes and the pre-charging processes will be described in following paragraphs.

Step C: in response to receiving a charging permission corresponding to the permission request from the server 140, enabling the charging device 120 to charge the rechargeable battery 118b.

In some embodiments, when the processing unit 112 receives the charging permission (e.g., a token) corresponding to the permission request from the server 140, it can be considered that the server 140 allows the rechargeable battery 118*b* to be charged. Therefore, the processing unit 112 can enable the charging device 120 to provide electricity to the rechargeable battery 118*b*. For instance, in some embodiments, the processing unit 112 can turn on the relay of the battery connecting module 118*a* to connect the rechargeable battery 118*b* to the charging device 120. In some embodiments, the processing unit 112 can control, via the information channel, the battery management system of the rechargeable battery 118*b* for the rechargeable battery 118*b* to accept external power input. During charging, the processing unit 112 can keep monitoring the battery connecting module 118*a* and the rechargeable battery 118*b* of the battery unit 118 based on some in-charging detect/manage processes and/or some post-charging detect/manage processes. Charging can be stopped when errors are detected. A confirmation (or maybe turning off the vehicle 110 and the battery unit 118) will be performed when the charge is completed. It is noted that the details of the in-charging detect/manage processes and/or the post-charging detect/manage processes will be described in following paragraphs.

Figure 3A:
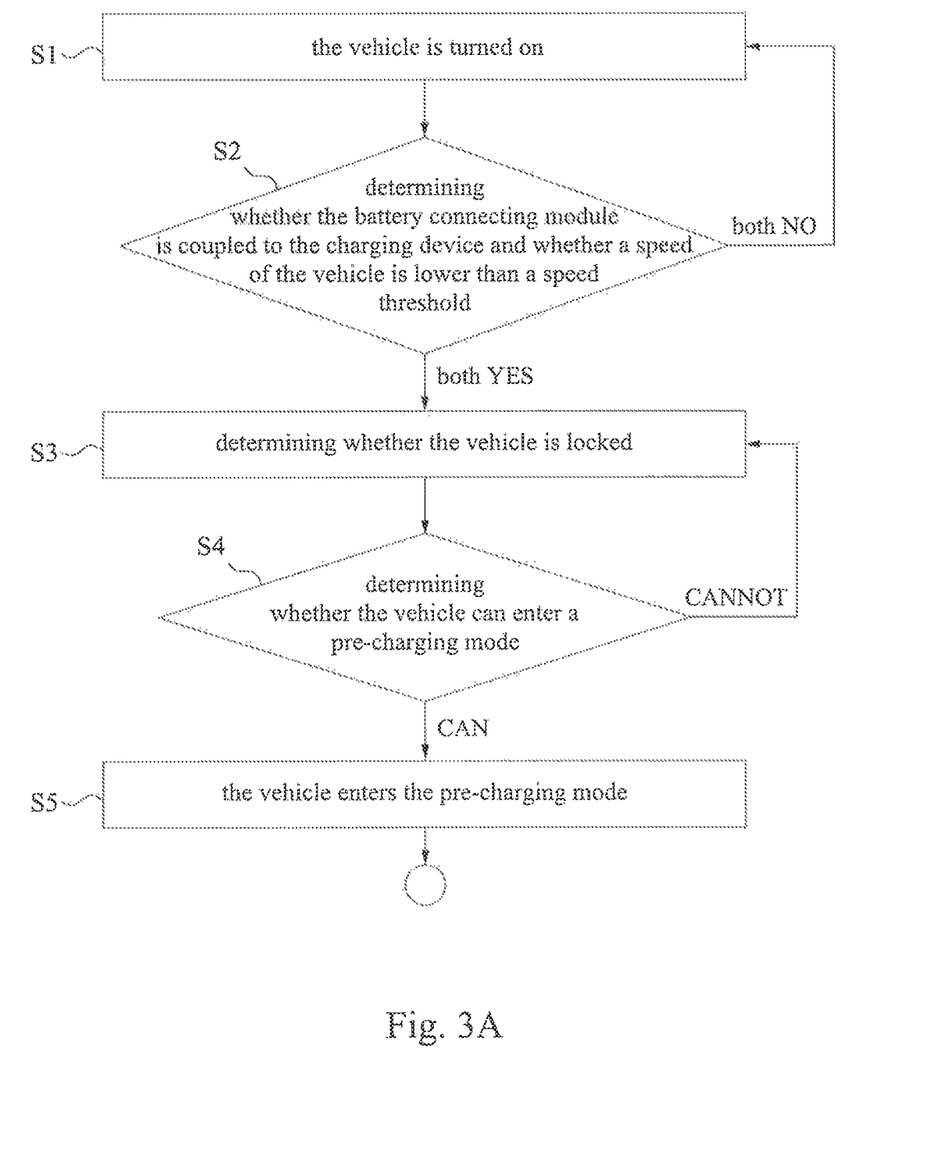
FIG. 3A is a schematic diagram illustrating a vehicle charging method based on some embodiments of present disclosure.
Figure 3B:
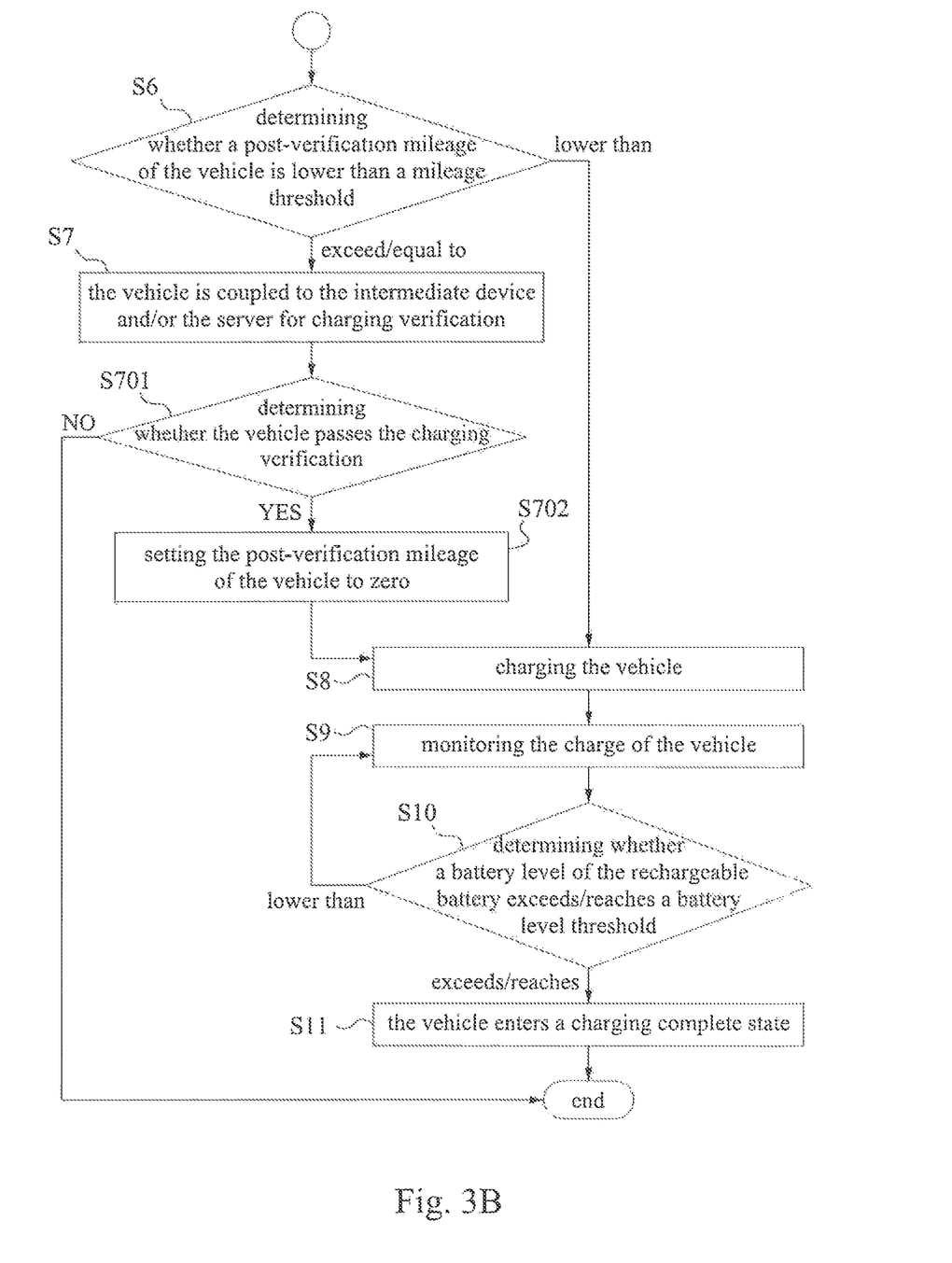
FIG. 3B is a schematic diagram illustrating a vehicle charging method based on some embodiments of present disclosure.

FIG. 3A and FIG. 3B are schematic diagrams illustrating a vehicle charging method based on some embodiments of present disclosure. In some embodiments, the vehicle charging method shown in FIG. 3A and FIG. 3B can be used to explain some detail steps of the vehicle charging method of FIG. 2. Such vehicle charging method can be performed by the processing unit 112 of the vehicle 110 shown in FIG. 1. The embodiments of FIG. 1 and FIG. 2 can be viewed together. The operations of the components (or unit) of the vehicle charging system can be found in these embodiments.

Reference is made to FIG. 2 and FIG. 3A. The step A of FIG. 2 can include two sub-steps such as steps S1-S2 shown in FIG. 3A.

Step S1: the vehicle 110 is turned on.

In some embodiments, the user of the vehicle 110 can use a start device and/or a start button to activate the vehicle 110. In this way, the vehicle 110 is turned on (e.g., power on). In some embodiments, the start device of the vehicle 110 can be a key or a radio-frequency identification card, etc. The user can turn on the vehicle 110 by inserting the key into a key hole of the vehicle 110 or moving the radio-frequency identification card to a sensing part of the vehicle 110. When the vehicle 110 is on, the battery unit 118 can keep providing electricity to the processing unit 112, the communication unit 114 and the human-machine interface 116 for operation. In some embodiments, when the vehicle 110 is turned on, it can be considered on standby or in operation.

To prevent the vehicle 110 from being charged while moving, in step S2, the processor can determine whether the battery connecting module 118*a* is coupled to the charging device 120 and whether a speed of the vehicle 110 is lower than a speed threshold. If it is determined that the battery connecting module 118*a* is coupled to the charging device 120 and the speed of the vehicle 110 is lower than the speed threshold, step S3 can be performed. If it is determined that the battery connecting module 118*a* is not coupled to the charging device 120 and/or the speed of the vehicle 110 exceeds the speed threshold, the execution of processing 112 would return to the step S1. In such case, the vehicle 110 cannot enter a pre-charging state. As mentioned, when the user tries to charge the vehicle 110, he/she can couple the input end 122 of the charging device 120 to the mains electricity or power sockets (e.g., the power source PS) and couple the output end 126 of the charging device 120 to the power input socket of the vehicle 110. In this way, the power input socket of the vehicle 110 can be electrically coupled to the battery connecting module 118*a* of the battery unit 118. In some embodiments, when the charging device 120 is power-connected (e.g., the input end is connected to the power source PS), the processor 112 of the vehicle 110 can sense variations on the signal detect terminal and determine whether the charging device 120 is connected.

In some embodiments, when the vehicle 110 is turned on, the processing unit 112 can determine whether the battery unit 118 is coupled to the output end 126 of the charging device 120 via the power input socket of the vehicle 110. In some embodiments, when the vehicle 110 is turned on, the processing unit 112 can also determine whether a rotation of a driving component (e.g., wheels) of the vehicle 110 is slower than a speed threshold, such as 5 km per hour. It is understood that such determination is for both safety reasons and legal requirements. Charging the vehicle 110 should only be allowed when the vehicle 110 is not being ridden (e.g., 0 km/per hour or say "stayed"). However, present disclosure is not limited thereto. In some cases, the speed threshold can be set by the manufacturer of the vehicle 110 or the user so that the user is allowed to move the vehicle in a short distance.

In some embodiments, if the processing unit 112 determines that the vehicle 110 is coupled to the charging device 120 its speed is slower than the speed threshold, the processing unit 112 can execute the step S3 to continue the charging process. If any of the conditions mentioned above is not met, execution of the processing unit 112 would return to the step S1 and the processing unit 112 stays power on (in other words, stays in standby mode).

Reference is made to FIG. 2 and FIGS. 3A-3B. The step B of FIG. 2 can include some sub-steps such as steps S3-S7 shown in FIGS. 3A-3B.

Step S3: determining whether the vehicle 110 is locked. If the vehicle 110 is locked, the execution enters a step S4. If the vehicle 110 is unlocked, keep waiting until the vehicle 110 is locked. Similar to the step S2, the step 33 can prevent the vehicle 110 being charged while moving.

In some embodiments, when the vehicle 110 is turned on, the processing unit 112 can determine whether the vehicle 110 is locked. Being locked can refer to an unavailable state for the user to ride the vehicle 110. For example, a state that the user cannot control the vehicle 110 to perform electricity-required operations. The user can rotate a steering structure (i.e. the handles) of the vehicle 110 to a specific forward angle and/or press specific buttons in order to set the vehicle 110 to the locked state. It is understood that such lock determination is another mechanism for both safety reasons and legal requirements. It has been mentioned that charge to the vehicle 110 should only be allowed when the vehicle 110 is not being ridden. If the user needs to move the vehicle in a short distance, the user can put the vehicle 110 into unlocked and move the vehicle 110. Then, the vehicle 110 could be locked again before the charging goes on.

In some embodiments, when all the conditions of the steps S2-S3 are met, the processing unit 112 can perform the step S4 to continue the charging process. If there is any condition of the steps S2-S3 is not met, the processing unit 112 can repeat the steps S2-S3. Unless all the conditions of the steps S2-S3 are met, the processing unit 112 stays in standby mode.

Step S4: determining whether the vehicle 110 can enter a pre-charging mode. If it is determined that the vehicle 110 can enter the pre-charging mode, the processing unit 112 would execute step S5. If it is determined that the vehicle 110 cannot enter the pre-charging mode, the processing unit 112 would return to the step S3. This step (step S4) can be considered as a pre-charging detection process. The detection process is to confirm whether the vehicle 110 and the battery unit 118 can be charged under legitimate and safe conditions.

In some embodiments, when the vehicle 110 is locked, being coupled to the charging device 120, and having a speed lower than the speed threshold, it is shown that the vehicle 110 is prepared for charging. At this point, the processing unit 112 determines whether the vehicle 110 can enter the pre-charging mode. The determination for entering the pre-charging mode can include the following sub-processes: (1) checking whether the battery unit 118 is still coupled to the charging device 120; (2) determining whether the rechargeable battery 118b matches a charging-legitimate condition; (3) checking whether a security switch of the vehicle 110 is activated; and (4) checking whether the battery unit 118 is in a non-error state. The details of the determination processes (1)-(4) will be explained below.

Determination process (1): the processing unit 112 can check whether the battery unit 118 is still connected to the charging device 120. In some embodiments, during the steps S1-S4, it is possible that the charging device 120 is removed accidentally. Therefore, the processing unit 112 can check whether the connection between the battery unit 118 and the charging device 120 is steady and solid.

Determination process (2): the processing unit 112 can determine whether the rechargeable battery 118b matches the charging-legitimate condition. It is noted that, the term "charging-legitimate condition" can refer to a condition that the rechargeable battery 118b of the battery unit 118 can match a specific regulation or a rental/purchase plan. This condition can be used to check whether the charge of the rechargeable battery 118b is allowable under a business model of the manufacturer and/or retailer of the vehicle 110. For example, when the rechargeable battery 118b is coupled to the vehicle 110, the processing unit 112 of the vehicle 110 can establish a bidirectional safety check to the rechargeable battery 118b (e.g., via the information channel between the rechargeable battery 118b and the processing unit 112) in order to verify whether the rechargeable battery 118b is charging-legitimate.

As mentioned, the rechargeable battery 118b is configured with the BMS. The memory of the BMS can record information corresponding to the vehicle 110, such as user identities, rental/purchase plans, histories of use, and battery conditions, etc. The processing unit 112 can access the memory to check the rental/purchase plan of the user. The rental/purchase plan can note whether the rechargeable battery 118b of the vehicle 110 is allowed to be charged by the charging device. For example, legitimacy (i.e. the charging-legitimate condition of the rechargeable battery 118b) for the charging device 120 to charge the rechargeable battery 118b can be recorded by a feature bit in the memory of the BMS (e.g., the memory can be provided with an address to store a value of the feature bit). It is noted that the rental/purchase plan can be related to the vehicle 110 or the rechargeable battery 118b. In the embodiment, the feature bit can be used to verify whether it is legitimate for the charging device 120 to charge the rechargeable battery 118b (i.e. the charging-legitimate condition of the rechargeable battery 118b). However, present disclosure is not limited thereto. In some embodiments, the processing unit 112 can access the memory of the BMS to check the value of the feature bit in order to determine whether the battery unit 118 (i.e. the rechargeable battery 118b) matches the charging-legitimate condition. In some embodiments, the rental/purchase plan (which the user subscribed from the service provider) only allows the vehicle 110 to swap batteries at the battery exchange station and prohibits the user from charging the rechargeable battery 118b with the charging device 120. In such case, the rechargeable battery 118b connected to the battery unit 118 fails to match the charging-legitimate condition. In some embodiments, if the purchase information of the charging device 120 is recorded in the user information or the rental/purchase plan records, the value of the feature bit can be updated. The updated feature bit can indicate that the rechargeable battery 118b matches the charging-legitimate condition. In some embodiments, the processing unit 112 can retrieve the user information or the rental/purchase plan from the server 140 via the intermediate device 130. In some embodiments, if the processing unit 112 cannot access the memory of the BMS (or get an error while accessing), it could be interpreted that the rechargeable battery 118b fails to match a specific regulation (e.g., an unapproved battery or a modified battery). It is understood that the determination process can prevent the rechargeable battery 118b of the vehicle 110 from an illegal charge (a charge failing to match regulations or rental/purchase plans). Such illegal charge can be harmful to the vehicle, the battery, the users, or even the profits of the manufacturer.

Determination process (3): the processing unit 112 can check whether the security switch of the vehicle 110 is activated. In some embodiments, the activation of the security switch can be a locked state of a seat lock, a pressure sensing structure, or a latch structure of the vehicle 110. For example, when the seat lock of the vehicle 110 is locked, the processing unit 112 can determine that the security switch of the vehicle 110 is activated. Alternatively, when the pressure sensing structure is touched by a seat cover of the vehicle 110, the processing unit 112 can determine that the security switch of the vehicle 110 is activated. Or, when the rechargeable battery 118b is locked by the latch structure of the battery unit 118, the processing unit 112 can determine that the security switch of the vehicle 110 is activated. However, these examples are not intended to limit the configurations of the security switch of the vehicle 110. It is noted that the determination is also a mechanism for safety reasons and legal requirements. In some embodiments, the rechargeable battery 118b of the battery unit 118 is settled in a trunk of the vehicle 110. The security switch can be a structure around the seat cover of the vehicle 110. The activation of the security switch can be used to detect whether the seat cover of the vehicle 110 is closed. When the seat cover is closed, it is less likely for the user to access the battery unit 118. This mechanism is helpful for preventing the user from electrical injuries.

Determination process (4): the processing unit 112 can check whether the battery unit 118 is in a non-error state. In some embodiments, the processing unit 112 can check whether the rechargeable battery 118b is set in the battery unit 118 properly and check whether the connection between the rechargeable battery 118b and the battery connecting module 118a is well-connected. Furthermore, the processing unit 112 can check whether the rechargeable battery 18b is in the non-error state. As mentioned, the BMS of the rechargeable battery 118b has the memory storing the battery condition corresponding to the vehicle 110. The processing unit 112 can access the memory of the BMS to retrieve the battery condition of the rechargeable battery 118b. Based on the battery condition, the processing unit 112 can check whether the battery unit 118 is in the non-error state. In some embodiments, if the rechargeable battery 118b is detected with errors, malfunctions, or unsolved problems, the BMS of the rechargeable battery 118b can send a message of error/alert to the processing unit 112. It is noted that, in some embodiments, the term "error state" can be referring to relatively critical errors. A charge of the rechargeable battery 118b with critical errors can cause damage to the vehicle 110 and the battery itself. This determination process can be helpful for preventing such damage.

In some embodiments, if the processing unit 112 confirms the determinations processes (1)-(4) are good (determination result of determinations processes (1)-(4) are all 'YES'), the processing unit 112 confirms the vehicle 110 can enter the pre-charging mode. Then, the processing unit 112 can perform the step S5.

Step S5: the vehicle 110 enters the pre-charging mode. The step S5 is followed by a step S6. It is noted that this step can be considered a preparation before the charging can start. The step can provide the user with related information and turn on the battery unit 118 for charging.

In some embodiments, after the step S4, if the vehicle 110 can enter the pre-charging mode, the processing unit 112 can execute the step S5 to set the battery unit 118 to the pre-charging mode as well. The pre-charging mode can include following procedures: (1) setting the rechargeable battery 118b to a chargeable state; (2) turning on the human-machine interface 116; (3) measuring a battery level of the rechargeable battery 118b; and (4) storing a mileage of the vehicle 110 to the rechargeable battery 118b. Details of the procedures (1)-(4) are explained in the paragraphs below.

Procedure (1): the processing unit 112 can set the rechargeable battery 118b to chargeable state. In some embodiments, the processing unit 112 can turn a charging switch of the rechargeable battery 118b to "on" via the information channel (or send signal to the BMS of the rechargeable battery 118b via the information channel so that the charging switch can be turned on). In the turned-on state, the rechargeable battery 118b being coupled to the battery connecting module 118a can receive currents.

Procedure (2): the processing unit 112 can turn on the human-machine interface 116. As mentioned, in some embodiments, the human-machine interface 116 can include the displays (e.g., the dashboard) and/or the speakers. The human-machine interface 116 can show specific images (e.g., display specific icons or activate specific lights) on the displays and/or output specific audios through the speakers to notice the user/staff of the vehicle 110. Thus, the user/staff of the vehicle 110 can understand that the vehicle 110 has entered the pre-charging mode.

The procedure (3): the processing unit 112 can measure the battery level of the rechargeable battery 118b. In some embodiments, the processing unit 112 can access the BMS of the rechargeable battery 118b for the battery conditions and the current battery level of the rechargeable battery 118b (e.g., use the information exchanged with the BMS or reading the memory of the BMS directly). In this way, the processing unit 112 can obtain the current battery levels of all the rechargeable battery 118b in the battery unit 118 and calculate power consumption (and available power) of each rechargeable battery 118b.

Procedure (4): the processing unit 112 can store the mileage of the vehicle 110 to the rechargeable battery 118b. In some embodiments, the processing unit 112 can access the BMS of the battery connecting module 118a and write the current mileage of the vehicle 110 into the memory of the BMS. In this case, when the rechargeable battery 118b is removed from the battery unit 118, the BMS of the rechargeable battery 118b can keep the mileage of the vehicle 110.

When the user returns the rechargeable battery 118b to a battery exchange station, the server 140 can get the mileage of the vehicle 110 from the battery exchange station. In some embodiments, the processing unit 112 can send the current mileage of the vehicle 110 to the server 140 via the intermediate device 130.

In some embodiments, the processing unit 112 can perform the procedures (1)-(4) of the step S5 to control the vehicle 110 to enter the pre-charging mode. The, the processing unit 112 can go to the step S6. It is noted that the steps S1-S6 can be considered pre-charging detect processes for the vehicle 110. These steps are substantially "in-device" processes performed by the processing unit 112 of the vehicle 110 (or associated with other parts). It is noted that the following steps are related to the intermediate device 130 and the server 140 of the vehicle charging system 120. It is to say, the following processes can be understood to be "cross-device" steps. However, the embodiments are not intended to limit the scope of present disclosure. For example, in some embodiments, at the determination (2) of the step S4, the processing unit 112 can be communicatively coupled to the server 140, via the intermediate device 130, and send a request of battery verification to the server 140. In this way, the processing unit 142 can fetch the rental/purchase plan of the vehicle 110 from the storage unit 146 of the server 140. The processing unit 142 can generate an authentication result based on wrapping the rental/purchase plan and send the authentication result to the processing unit 112 of the vehicle 110. The processing unit 112 can determine whether it is legitimate to charge the battery unit 118 based on the authentication result. In such embodiment, the steps S1-S6 can be cross-device steps.

Reference is made to FIG. 2B. Step S6: determining whether a post-verification mileage of the vehicle 110 is lower than a mileage threshold. If it is determined that post-verification mileage of the vehicle 110 is higher than/equal to the mileage threshold, the processing unit 112 enters step S7. If it is determined that post-verification mileage of the vehicle 110 is lower than the mileage threshold, the processing unit 112 enters a step S8. This step can be considered a pre-charging detect process that can allow the user to move the vehicle 110 in a distance without re-verification.

In some embodiments, when the vehicle 110 enters the pre-charging mode, the processing unit 112 can determine whether the post-verification mileage of the vehicle 110 is lower than the mileage threshold. The mileage threshold can be, for example but not limited to, 2 kilometers. It is noted that, the term "post-verification mileage" can refer to an accumulated mileage being recorded by the processing unit 112 after each time the vehicle 110 receives verification from the server 140 (or the intermediate device 130). In some embodiments, the post-verification mileage can be stored in the memory of the processing unit 112.

In some embodiments, if the processing unit 112 determines that the post-verification mileage of the vehicle 110 is larger than/equal to the mileage threshold, it may represent that the vehicle 110 has been moved for a distance exceeding an acceptable mileage since last time the vehicle 110 was verified by the server 140 (or the intermediate device 130). If it is the case, the verification is required. Thus, the processing unit 112 performs the step S7.

In some embodiments, if the processing unit 112 determines that the post-verification mileage of the vehicle 110 is lower than the mileage threshold, it can be shown that, since last time the vehicle 110 was verified by the server 140 (or the intermediate device 130), the distance that the vehicle 110 being moved is lower than the acceptable mileage. If it is the case, the verification is not required. The processing unit 112 can go to the step S7. That is to say, once the vehicle 110 is verified, the user can charge the vehicle 110 repeatedly until the distance it moves exceeding the acceptable mileage. Therefore, the user is allowed to move the vehicle 110 in a short distance (e.g., a distance from one socket to another) without requesting a re-verification. The mechanism can provide better user experiences.

It is understood that, at the step S6, the determination of the post-verification mileage is merely an exemplary mechanism but no intended to limit the scope of the present disclosure. In some embodiments, the vehicle 110 can be configured with alternative mechanisms (e.g., time control) to improve user experiences. For instance, once the vehicle 110 is verified, the user is allowed to charge the vehicle 110 repeatedly in a fixed time (e.g., 30 minutes or 1 hour) without requesting a re-verification.

Step S7: the vehicle 110 is coupled to the intermediate device 130 and/or the server 140 for charging verification. This step can be considered a pre-charging manage process forcing a pre-charging verification from the server 140 before the vehicle 110 can be charged.

It is noted that the communicative coupling between the vehicle 110 and the intermediate device 130 is established by the communication unit 114 of the vehicle 110 and the communication unit 134 of the intermediate device 130. Via such communicative coupling, the processing unit 112 is able to establish the bidirectional information exchange with processing unit 132. Similarly, the communicative coupling between the intermediate device 130 and the server 140 is established by the communication unit 134 of the intermediate device 130 and the communication unit 144 of the server 140. Via such communicative coupling, the processing unit 132 is able to establish the bidirectional information exchange with processing unit 142. Hereinafter, the information exchange between the processing units can be understood using the communication units as mediums. It is noted that the details of signal transmissions among these unit will not be repeated herein.

In some embodiments, when the processing unit 112 determines that the post-verification mileage of the vehicle 110 exceeds/reaches the mileage threshold, the processing unit 112 can connect to the server 140 via the intermediate device 130 to request for charging verification. To better understand the charging verification mentioned in the step S7, the charging verification corresponds to the steps B-C (i.e. from sending the permission request to receiving the charging permission) described in FIG. 2. More specifically, the processing unit 112 can send the permission request to the processing unit 132 of the intermediate device 130. The processing unit 132 can receive the permission request.

In some embodiments, after receiving the permission request, the processing unit 132 of the intermediate device 130 can send a request of user information to the processing unit 112. In some embodiments, the processing unit 112 can send the user identity corresponding to the user of the vehicle 110 to the processing unit 132 based on the request of user information. The processing unit 132 can determine if it is necessary to apply verification to the vehicle 110.

In some embodiments, the intermediate device 130 and the server 140 are communicatively coupled via the network. The processing unit 112 can send the user information to the processing unit 142 of the server 140. The processing unit 142 can access the storage unit 146 for the user identities, the rental/purchase plans, and the histories of use, etc. Based on the rental/purchase plan of the vehicle 110, the processing unit 142 of the server 140 can determine whether to verify the vehicle 110.

In some embodiments, if the processing unit 142 of the server 140 determines to verify the vehicle 110, the processing unit 142 can transmit a request of history of use to the processing unit 132. The processing unit 132 can redirect the request of history of use to the processing unit 112. The processing unit 112 can access the rechargeable battery 118b of the battery unit 118 to obtain the history of use from the memory of the BMS. The history of use of the vehicle 110 can be delivered to the processing unit 142 of the server 140 via the intermediate device 130.

In some embodiments, based on the history of use and the rental/purchase plan of the vehicle 110, the processing unit 142 of the server 140 can determine whether the user is allowed to charge the vehicle 110. If the processing unit 142 determines that the user is allowed to charge the vehicle 110 under the rental/purchase plan, the processing unit 142 can send a request of mileage and battery level to the processing unit 132. The processing unit 132 can redirect the request of mileage and battery level to the processing unit 112 of the vehicle 110. It is noted that, in the battery exchange station design, the manufacture/retailer of the vehicle 110 can read the mileage of the vehicle 110 and/or the power consumption of the rechargeable battery 118b in order to determine whether the use of the vehicle 110 matches the rental/purchase plan (or charge extra fees from the user). If the user swaps the rechargeable battery 118b at a battery exchange station, the server 140 can access the battery exchange station to read the mileage of the vehicle 110 and/or the power consumption of the rechargeable battery 118b from the BMS of the rechargeable battery 118b. In the mechanism of present disclosure, at the time that the rechargeable battery 118b is charged by the charging device 120, the server 140 can obtain (and/or record) the mileage of the vehicle 110 and/or the power consumption of the rechargeable battery 118b via the intermediate device 130. In this manner, the server 140 can still perform the determination to count extra fee based on the information.

In some embodiments, when the processing unit 112 receives the request of mileage and battery level, the processing unit 132 can generate two sets of random digits. The processing unit 112 can encrypt the mileage of the vehicle 110 and the battery level of the rechargeable battery 118b based on one of the sets of random digits. Another set of random digits can be provided to the processing unit 142 of the server 140 for verification. The processing unit 112 can send the random digits, the encrypted mileage and the encrypted battery level to the processing unit 142 of the server 140, via the intermediate device 130.

In some embodiments, when the processing unit 142 receives the random digits, the encrypted mileage and the encrypted battery level, the processing unit 142 can use one set of random digits and a given key to decrypt the encrypted mileage and the encrypted battery level. In this manner, the processing unit 142 can obtain the original mileage and the original battery level of the vehicle 110. In some embodiments, the original mileage and the original battery level of the vehicle 110 can be stored in the storage unit 146. In some embodiments, after the processing unit 142 gets, the original mileage and the original battery level, the processing unit 142 can generate a token based on another set of random digits. The token can be wrapped into a charging permission and then sent to the processing unit 112 of the vehicle 110 via the intermediate device 130. The token can be considered a permit allowing the processing unit 112 of the vehicle 110 to charge the rechargeable battery 118b (e.g., via charging device 120 directly), In some embodiments, the intermediate device 130 is merely a medium for redirecting messages/information from the vehicle 110. It is not an active participant of the verification process. For example, the user information, mileage, battery level or the likes have been included in the permission request sending by the processing unit 112 of the vehicle 110.

It is noted that, in some embodiments, the token can be a one-time token. It means that the vehicle 110 can only use it once. In some embodiments, the token can be a reusable token. For example, the token can be stored in the intermediate device 130 for a period of time. In this period of time, the processing unit 112 of the vehicle 110 can request the token from the intermediate device 130 instead of connecting to the processing unit 142 of the server 140 for verification. For instance, the token can be stored in the intermediate device 130. The reusable token is corresponding to an access count. The processing unit 112 of the vehicle 110 can access the token from the intermediate device 130 repeatedly. When the access count reaches a fixed number, the token goes to invalid. In this case, the processing unit 112 of the vehicle 110 has to connect to the processing unit 142 of the server 140 for verification.

Reference is made to FIG. 2 and FIG. 3A. The step C of FIG. 2 can include some sub-steps such as steps S701-S702, and S8-S11 shown in FIG. 3B.

Step S701: determining whether the vehicle 110 passes the charging verification. If the vehicle 110 passes the charging verification, the processing unit 112 enters step S702. If the vehicle 110 fails to pass the charging verification, the charging process is ended. This step can be considered as a pre-charging managing process. If the vehicle 110 and/or the charging device 120 fail to match the manufacture's regulations or the rental/purchase plan of the user, the server 140 can disallow the rechargeable battery 118b from being charged by the charging device 120.

In some embodiments, if the processing unit 112 of the vehicle 110 receives the charging permission (e.g., the token) successfully, it means that the vehicle 110 passes the charging verification of the server 140. Then, the processing unit 112 can execute step S702.

In opposite, in some embodiments, if the processing unit 112 of the vehicle 110 fails to receive the charging permission (or, in some embodiments, the vehicle 110 can receive a message for not granting the charging permission), it represents that the vehicle 110 fails to pass the charging verification of the server 140. If it is the case, the charging process is ended. The processing unit 112 of the vehicle 110 can return to the step S3 and stay without going to the step S4.

Step S702: setting the post-verification mileage of the vehicle 110 to zero. When the step S702 is done, the processing unit 112 enters step S8. As mentioned, the post-verification mileage is a mechanism that allows the vehicle 110 to be charged without repeating verification in a short distance. The step S72 can be considered a pre-charging manage process for resetting the post-verification mileage when the vehicle 110 passes the verification of the server 140.

In some embodiments, if the vehicle 110 passes the charging verification, the processing unit 112 can access the memory and set the post-verification mileage of the vehicle 110 to zero. In other words, the processing unit 112 can delete a current value of the post-verification mileage. When the processing unit 112 of the vehicle 110 finishes the step S702, the processing unit 112 can execute the step S8.

Step 38: charging the vehicle 110.

In some embodiments, when the processing unit 112 of the vehicle 110 finished the step S702, the processing unit 112 can access the battery unit 118 to turn on the relay of the battery connecting module 118a. In some embodiments, if the processing unit 112 determines that the post-verification mileage of the vehicle 110 is lower than the mileage threshold (at the step 36), the processing unit 112 can turn on the relay of the battery connecting module 118a without requesting a re-verification. When the relay is turned on, a path connecting the battery connecting module 118a, the rechargeable battery 118b and the charging device 120 is formed. Through the path, electricity can be delivered from the power source PS to the charging device 120, and to the battery connecting module 118a via (e.g., outputting current transformed from the power source PS). In this manner, the battery connecting module 118a can increase the battery level of the rechargeable battery 118b with electricity. When the processing unit 112 finished the step S8, the processing unit 112 can go to step S9.

Step S9: monitoring the charge of the vehicle 110. After entering the step S9, the processing unit 112 would try step S10. This step can be considered as an in-charging detect process. The detection can prevent the battery unit 118, the rechargeable battery 118b and/or the charging device 120 from being damaged by potential errors.

In some embodiments, the processing unit 112 can keep monitoring the charge of the battery unit 118 in the vehicle 110 and determine whether to continue the charging process. In some embodiments, the battery unit 118 can be detected with several types of errors. For example, the errors can be: the charging device 120 is coupled to the battery connecting module 118a but the rechargeable battery 118b cannot receive any current, the rechargeable battery 118b reports errors, a malfunction being detected on the battery connecting module 118a, the charging device 120 and the battery connecting module 118a are disconnected, high temperatures being detected on the rechargeable battery 118b, the security switch (e.g., the seat lock) of the vehicle 110 being deactivated, the speed of the vehicle 110 exceeds/equal to the speed threshold, etc. Based on the type of error, the processing unit 112 can determine whether to continue the charging process.

For instance, in some embodiments, if the rechargeable battery 118b of the battery unit 118 reports an error but the error is not related to the charging process, the processing unit 112 could determine to continue the charging process. In another example, in some embodiments, if the security switch of the vehicle 110 is deactivated (e.g., the user opens the seat cover), the processing unit 112 can turn off the relay of the battery connecting module 118a to suspend/stop the charging process. It is because that the deactivation of the security switch can endanger the user. Alternatively, in some embodiments, if the power source PS is out, the processing unit 112 can stop the charging process and return to the steps S3 since the rechargeable battery 118b receives no current. When the power source PS is back on, the processing unit 112 can move to the following steps. However, it is noted that the errors of the battery unit 118 and the ways to response the errors should not be limited by the foregoing embodiments.

Step S10: determining whether a battery level of the rechargeable battery 118b exceeds/reaches a battery level threshold. If it is determined that the battery level of the rechargeable battery 118b exceeds/reaches the battery level threshold, enters a step S11. If it is determined that the battery level of the rechargeable battery 118b is lower than the battery level threshold, return to the step S9. This step can be considered an in-charging detect process. The detection can monitor whether the charge of the rechargeable battery 118b has met an acceptable level, in case that the charging process is unsuccessful.

In some embodiments, the processing unit 112 can keep monitoring the charge of the battery unit 118 and determine whether the battery level of the rechargeable battery 118b in the battery unit 118 exceeds/reaches the battery level threshold (e.g., 80% or 90%, but not limited thereto). In some embodiments, if the processing unit 112 determines that the battery level of the rechargeable battery 118b exceeds/reaches the battery level threshold, it shows that the charge of the rechargeable battery 118b has met the acceptable level (e.g., reached mentioned battery level threshold). Then, the processing unit 112 can perform the step S11. In some embodiments, if the processing unit 112 determines that the battery level of the rechargeable battery 118b is lower than the battery level threshold, it shows that the charge of the rechargeable battery 118b has not met the acceptable level. The processing unit 112 can stay at the step S9 to continue the charge of the rechargeable battery 118b.

Step S11: the vehicle 110 enters a charging complete state. When the step S11 is done, the charging process is ended. This step can be considered a post-charging manage process. It can turn off the vehicle 110 and the battery unit 118 after the charge is completed to avoid unnecessary power consumption.

In some embodiments, if the processing unit 112 determines that the battery level of the vehicle 110 exceeds/reaches the battery level threshold, the processing unit 112 can control the vehicle 110 to enter the charging complete state. At step S11, the processing unit 112 controlling the vehicle 110 to enter the charging complete state can further include following sub-procedures: (1) setting the battery unit 118 to a non-chargeable state; (2) turning off the human-machine interface 116; and (3) resetting the rechargeable battery 118b of the battery unit 118. Details of the procedures (1)-(3) will be explained in following paragraphs.

Procedure (1): the processing unit 112 can set the battery unit 118 to a non-chargeable state. In some embodiments, the processing unit 112 can turn off the relay of the battery connecting module 118a and/or turn the charging switch of the rechargeable battery 18b to "off" so that the rechargeable battery 18b of the battery unit 118 will not be allowed to receive currents.

Procedure (2): the processing unit 112 can turn the human-machine interface 116 off. As mentioned, in some embodiments, the human-machine interface 116 can include the displays (e.g., the dashboard) and/or the speakers. The human-machine interface 116 can turn off the display and/or output specific audios through the speakers to notice the user/staff of the vehicle 110. In this way, the user/staff of the vehicle 110 can understand that the vehicle 110 has entered the charging complete state.

Procedure (3): the processing unit 112 can reset the rechargeable battery 118b of the battery unit 118. As mentioned, in some embodiments, the rechargeable battery 118b of the battery unit 118 is configured with the battery management system (BMS). The memory of the BMS can record the histories of use and the battery conditions of the vehicle 110. At this step, the processing unit 112 can access the memory to reset the histories of use and the battery conditions, via the channel of information. By doing this, the information being stored in the BMS of the rechargeable battery 118b can be updated.

In some embodiments, when the processing unit 112 finished (or at least finished part of) the procedures (1)-(3), the processing unit 112 can end the charging process.

It is noted that, in the forgoing embodiments, the vehicle 110, the charging device 120, the intermediate device 130 and the server 140 of the vehicle charging system 120 are associated to perform the steps S1-S11. However, the scope of present disclosure is not limited to those embodiments. In some embodiments, the vehicle 110 can be communicatively coupled to the server 140 in a direct manner (e.g., via an access point or a physical cable) instead of passing information via the intermediate device 130. In this embodiment, the vehicle 110 and the server 140 can still perform the steps A-C (shown in FIG. 2) and the steps S1-S11 (shown in FIGS. 3A-3B) in a similar way.

Figure 4:
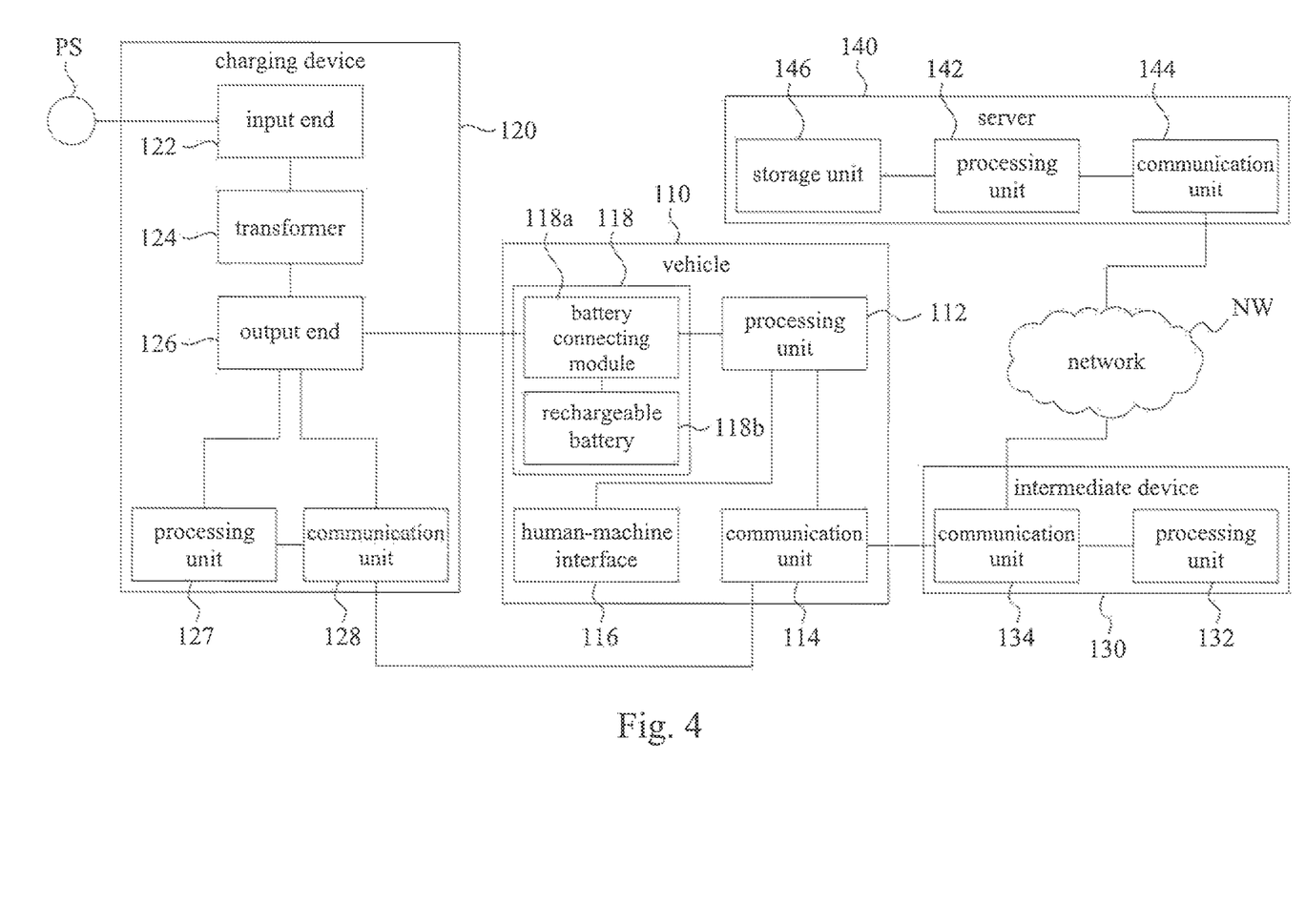
FIG. 4 is a schematic diagram illustrating a vehicle charging system based on some embodiments of present disclosure.

In some embodiments, various configurations of the charging device 120 can provided the vehicle charging system 120 with more functions. Reference is made to FIG. 4. FIG. 4 is a schematic diagram illustrating a vehicle charging system based on some embodiments of present disclosure. As shown in FIG. 4, the vehicle charging system 120 is substantially similar to the embodiment of FIG. 4. The vehicle charging system 120 can include the vehicle 110, the charging device 120, the intermediate device 130 and the server 140. It is different that, in this embodiment, the charging device 120 further includes a processing unit 127 and a communication unit 128. The processing unit 127 is electrically coupled to the communication unit 128. In some embodiments, the processing unit 127 can be implemented by a system on chip (SoC) including a processor and a memory. The processor can be associated with the memory to control the transformer 124 and the output end 126 so that the current/voltage output can be controlled. The communication unit 128 can be coupled to the processing unit 112 of the vehicle 110 via CAN bus standard. In this manner, the processing unit 127 and the processing unit 112 can establish bidirectional information exchange with each other.

In some embodiments of FIG. 4, the charging device 120 is provided with a function of establishing information exchange with the vehicle 110. For instance, as shown in FIG. 4, the charging device 120 cam include the communication unit 128. The communication unit 128 is coupled to the communication unit 114 of the vehicle 110. In some embodiments, the output end 126 of the charging device 120 can be connected to the battery unit 118 via a channel of power and a channel of information. Such configuration is similar to the connection between the battery connecting module 118a and the rechargeable battery 118b. Via the connection, the charging device 120 can establish information exchange with the processing unit 112 of the vehicle 110 or the rechargeable battery 118b.

When the battery unit 118 is being charged, the processing unit 112 of the vehicle 110 can send charging information (e.g., information about the electricity output of the charging device) to the processing unit 127 via the communication unit 128 so that the processing unit 127 can control/stop the current at the transformer 124 and the output end 126 dynamically. For instance, in some embodiments, at the step S9, the processing unit 112 can access the battery connecting module 118a to detect a temperature of the rechargeable battery 118b. The charging information being sent to the processing unit 127 can include the temperature of the rechargeable battery 118b. Based on the temperature of the rechargeable battery 118b, the processing unit 127 can adjust the output current dynamically. In an alternative embodiment, the processing unit 112 or the BMS of the rechargeable battery 118b can generate a charging instruction based on the temperature of the rechargeable battery 118b. The processing unit 127 of the charging device 120 can receive the charging instruction and control the current/voltage of the electricity output (e.g., a predetermined value of the current/voltage can be wrapped in the charging instruction) of the charging device 120 accordingly. In this manner, the charging device 120 can perform fast charge and/or safe charge to the rechargeable battery 118b with proper current/voltage. For instance, in some embodiments, the transformer 124 can include a plurality of transformers and rectifiers (can be the same type or different types), the processing unit 127 can control the outputs of these transformers and rectifiers based on the charging information (e.g., two transformers can be coupled in serial to double the voltage, or two transformers can be coupled in parallel to double the current). In such configuration, the processing unit 112 can control the connections among the transformers and the rectifiers in the transformer 124 in order to adapt different connections between the battery connecting module 118a and the rechargeable battery 118b (e.g., the rechargeable battery 118b and the battery connecting module 118a can be coupled in serial/parallel). It is noted that, with the configuration, the charging device 120 is allowed to provide proper charging plans to the rechargeable battery 18b.

In addition, the configuration of the processing unit 127 and the communication unit 128 can provide the vehicle 110 with more functions. In some embodiments of FIG. 4, at the determination (1) of the step S4, the processing unit 112 can visit the processing unit 127 for an identity of the charging device 120 (e.g., product ID). Then, the processing unit 112 can connect to the server 140, via the intermediate device 130, to access the storage unit 146. By doing this, the processing unit 112 can check if the charging device 120 matches to the vehicle 110. If it is determined that the charging device 120 fails to match the vehicle 110, the processing unit 112 can reject to set the rechargeable battery 118b to the chargeable state (at the procedure (1) of the step S5). It is to say, the processing unit 112 can determine whether to charge the rechargeable battery 118b based on the identity of the charging device 120 (or the rental/purchase plan of the vehicle 110, as mentioned). This approach is also helpful for preventing the rechargeable battery 8b from being charged by illegal/unverified chargers.

Compare to the embodiment of FIG. 1, the charging device 120 shown in FIG. 4 is not a passive device being fully controlled for providing electricity to the rechargeable battery 118b. The charging device 120 here is a device that can associate with the processing unit 112 of the vehicle 110. The charging device 120 in such configuration is able to determine whether to transmit electricity to the rechargeable battery 118b and control the current/voltage being outputted to the rechargeable battery 118b, dynamically.

In the vehicle charging system 120 (e.g., in FIG. 1 and FIG. 4), various functional components or blocks have been introduced. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. However, the scope of present disclosure is not limited to the embodiments.

In view of foregoing embodiments, the advantages of present disclosure, at least, includes: (1) the information being used to verify the vehicle 110 (and/or the charging device 120 and the rechargeable battery 118b) is stored in the server 140, it can provide higher safety of information; (2) the information being used to verify the vehicle 110 (and/or the charging device 120 and the rechargeable battery 118b) can be updated based on the rental/purchase plan of the user, it can be applied under different business models; (3) the manufacture/retailer of the vehicle 110 can program several sub-processes in the charging process (e.g., the pre-charging detect process, the pre-charging process, or the in-charging manage process, and the likes) to ensure the charging safety; (4) the vehicle 110 can retrieve the authentication token from the intermediate device 130 and/or the server 140, it is safe and convenient.

Based on present disclosure, a vehicle charging system and a vehicle charging method are disclosed. The system and method can establish a safer authentication mechanism for the vehicle and the charging device and stop/continue the charging process when specific conditions are met. The convenience of the system/method (e.g., using the post-verification mileage to determine whether a re-verification is required) is considered in present disclosure as well. In general, present disclosure can provide the user with better experiences.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

We claim:

1. A vehicle, comprising:
   a battery connecting module, configured to couple to at least one rechargeable battery;
   a processor, coupled to the battery connecting module, wherein the processor is configured to:
   determine whether the battery connecting module is coupled to a charging device;
   in response to the battery connecting module being coupled to the charging device, transmit a permission request to a server;
   in response to receiving a charging permission corresponding to the permission request from the server, allow the charging device to charge the at least one rechargeable battery,
   count a post-verification mileage of the vehicle;
   in response to the post-verification mileage is lower than a mileage threshold, allow the charging device to charge the at least one rechargeable battery; and
   in response to receiving the charging permission from the server, set the post-verification mileage to zero.

2. The vehicle of claim 1, further comprising:
   a communication unit, coupled to the processor,
   wherein the permission request is sent from the processor to the server via an intermediate device being coupled to the communication unit, and the charging permission is sent to the processor via the intermediate device.

3. The vehicle of claim 1, wherein the processor is further configured to:
   determining whether a speed of the vehicle is lower than a speed threshold;

determine whether the vehicle is in a locked mode; and
if the speed of the vehicle is lower than the speed threshold, the vehicle is in the locked mode and the battery connecting module is coupled to the charging device, control the at least one rechargeable battery to enter a pre-charging mode and transmit the permission request to the server.

4. The vehicle of claim 1, wherein the processor is further configured to:
determine whether the at least one rechargeable battery matches a charging-legitimate condition; and
if the at least one rechargeable battery matches the charging-legitimate condition and the battery connecting module is coupled to the charging device, control the at least one rechargeable battery to enter a pre-charging mode and transmit the permission request to the server.

5. The vehicle of claim 4, wherein the charging-legitimate condition comprising matching of the at least one rechargeable battery with at least one of a regulation or a rental/purchase plan.

6. The vehicle of claim 4, wherein the determination of whether the at least one rechargeable battery matches the charging-legitimate condition by the processor further comprising:
reading a feature bit stored in a memory of the at least one rechargeable battery; and
determining whether the at least one rechargeable battery matches the charging-legitimate condition based on the feature bit.

7. The vehicle of claim 1, wherein the processor is further configured to:
determine whether a security switch of the vehicle is activated; and
if the security switch is activated and the battery connecting module is coupled to the charging device, control the at least one rechargeable battery to enter a pre-charging mode and transmit the permission request to the server.

8. The vehicle of claim 1, wherein the processor is further configured to perform the following:
in response to an error of the battery connecting module or an error of the at least one rechargeable battery, suspend or stop the charging device to charge the at least one rechargeable battery.

9. The vehicle of claim 1, wherein the processor is further configured to:
transmit charging information of the at least one rechargeable battery to the charging device, such that the charging device dynamically controls at least one of a voltage or a current being outputted to the at least one rechargeable battery based on the charging information.

10. A vehicle, comprising:
a battery connecting module, configured to couple to at least one rechargeable battery;
a processor, coupled to the battery connecting module, wherein the processor is configured to:
determine whether the battery connecting module is coupled to a charging device;
in response to the battery connecting module being coupled to the charging device, transmit a permission request to a server;
in response to receiving a charging permission corresponding to the permission request from the server, allow the charging device to charge the at least one rechargeable battery, and
determine whether a security switch of the vehicle is activated,
wherein the security switch comprises at least one of a seat lock, a pressure sensing structure or a latch structure.

11. A vehicle charging system, characterized by comprising:
a server;
a charging device;
at least one rechargeable battery; and
a vehicle, coupled to the server, wherein the vehicle comprises:
a battery connecting module, configured to couple to the at least one rechargeable battery; and
a processor, coupled to the battery connecting module, wherein the processor is configured to:
determine whether the battery connecting module is coupled to the charging device;
in response to the battery connecting module being coupled to the charging device, transmitting a permission request to the server;
in response to receiving a charging permission corresponding to the permission request from the server, allow the charging device to charge the at least one rechargeable battery,
count a post-verification mileage of the vehicle;
in response to the post-verification mileage is lower than a mileage threshold, allow the charging device to charge the at least one rechargeable battery; and
in response to receiving the charging permission from the server, set the post-verification mileage to zero.

12. The vehicle charging system of claim 11, wherein the vehicle further comprising:
a communication unit, coupled to the processor,
wherein the permission request is sent from the processor to the server via an intermediate device coupled to the communication unit, and the charging permission is sent to the processor via the intermediate device.

13. The vehicle charging system of claim 11, wherein the processor of the vehicle is further configured to:
determine whether a speed of the vehicle is lower than a speed threshold;
determine whether the vehicle is in a locked mode; and
if the speed of the vehicle is lower than the speed threshold, the vehicle is in the locked mode and the battery connecting module is coupled to the charging device, control the at least one rechargeable battery to enter a pre-charging mode and transmit the permission request to the server.

14. The vehicle charging system of claim 11, wherein the processor of the vehicle is further configured to perform:
determine whether the at least one rechargeable battery matches a charging-legitimate condition; and
if the at least one rechargeable battery matches the charging-legitimate condition and the battery connecting module is coupled to the charging device, control the at least one rechargeable battery to enter a pre-charging mode and transmit the permission request to the server.

15. The vehicle charging system of claim 14, wherein the determination of whether the at least one rechargeable battery matches the charging-legitimate condition by processor of the vehicle further comprising:
reading a feature bit stored in a memory of the at least one rechargeable battery; and determining whether the at least one rechargeable battery matches the charging-legitimate condition based on the feature bit.

16. The vehicle charging system of claim 11, wherein the processor of the vehicle is further configured to:
   determine whether a security switch of the vehicle is activated; and
   if the security switch is activated and the battery connecting module is coupled to the charging device, control the at least one rechargeable battery to enter a pre-charging mode and transmit the permission request to the server.

17. The vehicle charging system of claim 11, wherein the processor of the vehicle is further configured to:
   transmit charging information of the at least one rechargeable battery to the charging device, such that the charging device dynamically controls at least one of a voltage or a current being outputted to the at least one rechargeable battery based on the charging information.

18. The vehicle charging system of claim 17, wherein the charging device further comprising:
   a plurality of transformers, configured to be selectively coupled with each other in a serial manner or in a parallel manner, in order to dynamically control at least one of the voltage or the current.

19. A vehicle charging method, applied on a vehicle, and the vehicle charging method comprising:
   determining whether a battery connecting module of the vehicle is coupled to a charging device;
   in response to the battery connecting module being coupled to the charging device, transmitting a permission request to a server;
   in response to receiving a charging permission corresponding to the permission request from the server, allowing the charging device to charge the at least one rechargeable battery;
   counting a post-verification mileage of the vehicle;
   in response to the post-verification mileage is lower than a mileage threshold, allowing the charging device to charge the at least one rechargeable battery; and
   in response to receiving the charging permission from the server, setting the post-verification mileage to zero.

20. The vehicle charging method of claim 19, further comprising:
   determining whether a speed of the vehicle is lower than a speed threshold;
   determining whether the vehicle is in a locked mode; and
   if the speed of the vehicle is lower than the speed threshold, the vehicle is in the locked mode and the battery connecting module is coupled to the charging device, controlling the at least one rechargeable battery to enter a pre-charging mode and transmitting the permission request to the server.

21. The vehicle charging method of claim 19, further comprising:
   determining whether the at least one rechargeable battery matches a charging-legitimate condition; and
   if the at least one rechargeable battery matches the charging-legitimate condition and the battery connecting module is coupled to the charging device, controlling the at least one rechargeable battery to enter a pre-charging mode and transmitting the permission request to the server.

22. The vehicle charging method of claim 21, further comprising:
   reading a feature bit stored in a memory of the at least one rechargeable battery; and
   determining whether the at least one rechargeable battery matches the charging-legitimate condition based on the feature bit.

23. The vehicle charging method of claim 19, further comprising:
   determining whether a security switch of the vehicle is activated; and
   if the security switch is activated and the battery connecting module is coupled to the charging device, controlling the at least one rechargeable battery to enter a pre-charging mode and transmitting the permission request to the server.

24. The vehicle charging method of claim 19, further comprising:
   transmitting charging information of the at least one rechargeable battery to the charging device, such that the charging device dynamically controls at least one of a voltage or a current being outputted to the at least one rechargeable battery based on the charging information.

* * * * *